(12) United States Patent
Moorer

(10) Patent No.: US 9,445,210 B1
(45) Date of Patent: Sep. 13, 2016

(54) WAVEFORM DISPLAY CONTROL OF VISUAL CHARACTERISTICS

(71) Applicant: Adobe Systems Incorporated, San Jose, CA (US)

(72) Inventor: James Anderson Moorer, Panacea, FL (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/663,231

(22) Filed: Mar. 19, 2015

(51) Int. Cl.
*G10L 21/06* (2013.01)
*H04R 29/00* (2006.01)
*G10L 15/02* (2006.01)
*G10L 21/10* (2013.01)
*G06F 3/16* (2006.01)
*G10L 13/033* (2013.01)

(52) U.S. Cl.
CPC .............. *H04R 29/008* (2013.01); *G06F 3/16* (2013.01); *G10L 13/033* (2013.01); *G10L 15/02* (2013.01); *G10L 21/06* (2013.01); *G10L 21/10* (2013.01); *G10L 2015/025* (2013.01)

(58) Field of Classification Search
CPC ....... G10L 21/06; G10L 15/04; G10L 21/10; G10L 2015/025; G10L 13/033; G06F 3/16; H04R 29/008
See application file for complete search history.

(56) References Cited

U.S. PATENT DOCUMENTS

| | | | |
|---|---|---|---|
| 6,184,898 B1 | 2/2001 | Rice et al. | |
| 7,232,948 B2 * | 6/2007 | Zhang ................. | G10H 1/0033 704/246 |
| 7,500,190 B1 * | 3/2009 | Bhatt ................... | G11B 27/034 345/440.1 |
| 7,521,622 B1 * | 4/2009 | Zhang ................... | G10L 25/78 84/603 |
| 2007/0067174 A1 * | 3/2007 | Verma ..................... | G10L 15/26 704/276 |
| 2008/0264239 A1 * | 10/2008 | Lemons .................. | G10L 17/26 84/477 R |
| 2009/0070674 A1 * | 3/2009 | Johnston ................. | G06F 3/048 715/716 |
| 2009/0281810 A1 * | 11/2009 | Sziklai .................... | G10L 21/06 704/276 |
| 2010/0198583 A1 * | 8/2010 | Su .......................... | G10L 21/06 704/9 |
| 2011/0093274 A1 * | 4/2011 | Lee ......................... | G10L 21/06 704/276 |
| 2014/0035920 A1 * | 2/2014 | Duwenhorst ......... | G06T 11/001 345/440 |
| 2015/0070265 A1 * | 3/2015 | Cruz-Hernandez ..... | G10L 21/06 345/156 |

OTHER PUBLICATIONS

Adobe, "Displaying audio in the waveform editor", retrieved from "www.archive.org", archiving date: Dec. 8, 2012.*
Mannell, "Speech spectra and Spectrograms", http://clas.mq.edu.au; retrieved from "www.archive.org", archiving date: Mar. 4, 2011.*

(Continued)

*Primary Examiner* — Jialong He
(74) *Attorney, Agent, or Firm* — Wolfe-SBMC

(57) ABSTRACT

Waveform display control techniques of visual characteristics are described. In one or more examples, a method is described of increasing user efficiency in identifying particular sounds in a waveform display of sound data without listening to the sound data. Sound data received by a computing device is partitioned to form a plurality of sound data time intervals. A signature is computed for each of the plurality of sound data time intervals by the computing device based on features extracted from respective said sound data time intervals. The computed signatures are mapped by the computing device to one or more colors. Output of a waveform in a user interface is controlled by the computing device, in which the waveform represents the sound data and each of the sound data time intervals in the waveform have the mapped one or more colors.

20 Claims, 12 Drawing Sheets

(56) References Cited

OTHER PUBLICATIONS

Wikipedia, "Spectrogram", retrieved from "www.archive.org", archiving date: Feb. 10, 2014.*
Rice, "Frequency-Based Coloring of the Waveform Display to Facilitate Audio Editing and Retrieval", Audio Engineering Society Convention Paper, Oct. 7-10, 2005 New York, New York USA.*
FindSounds, "Search the web for sounds—FindSounds Palette", Retrieved from http://www.archive.org, archived on May 1, 2006.*
"Cornparisonics—Audio Editor", Retrieved from the Internet at: <<http://www.comparisonics.com/CSplayer.html> on Feb. 9, 2015, 1 page.
"FindSounds—Search the Web for Sounds", Retrieved from Internet at: <<http://www.findsounds.com/palette.html>> on Feb. 9, 2015, 5 pages.
Rice, "Searching for Sounds: A Demonstration of FindSounds.com and FindSounds Palette", Proceedings of the International Computer Music Conference, Nov. 1-6, 2004, Coral Gables, Florida, pp. 215-218, Nov. 2004, 4 pages.
Rice, "A Web Search Engine for Sound Effects", Audio Engineering Society—Convention Paper. Presented at the 119th Convention Oct. 7-10, 2005 New York, New York USA, Oct. 2005, 6 pages.

* cited by examiner

900 ⟶                                                                    ⤹ 120

| Waveform | File Name | Description |
|---|---|---|
|  | Sirens.wav | toy siren |
|  | fa-siren.wav | siren |
|  | siren.wav | siren |
|  | TrafficAlert... | siren |
|  | thunder.wav | siren |
|  | StreetYelp.... | siren |
|  | siren.wav | firehouse siren |
|  | siren.wav | siren |
|  | SIREN.WAV | siren |
|  | Siren Loop ... | alarm/siren |

*Fig. 9*

WAVEFORM DISPLAY CONTROL OF VISUAL CHARACTERISTICS

BACKGROUND

Representation of sound in a visual manner continues to provide a variety of challenges. By its very nature, this representation involves transformation from consumption of the sound by one sense (e.g., hearing) for consumption by another sense, e.g., visually. One technique that has been developed to provide such a representation is through use of a waveform that is displayed visually in a user interface, e.g., as part of sound editing functionality. This typically involves display of a period of time over which the sound it output with indications of intensity (e.g., loudness) of the sound at particular points in time.

However, recognition of sounds within this conventional display of the waveform typically requires significant amounts of experience on the part of a user to even guess at what sounds are being output at corresponding points in time. Consequently, conventional waveforms lack intuitiveness due to limitations in representing the sounds, often requiring users to actually listen to the sound data to locate a particular point of interest, in order to determine what is being represented by the waveform as a whole (e.g., to locate a particular sound file), and so forth.

SUMMARY

Waveform display control techniques of visual characteristics are described. In one or more examples, a method is described of increasing user efficiency in identifying particular sounds in a waveform display of sound data without listening to the sound data. Sound data received by a computing device is partitioned to form a plurality of sound data time intervals. A signature is computed for each of the plurality of sound data time intervals by the computing device based on features extracted from respective sound data time intervals. The computed signatures are mapped by the computing device to one or more colors. Output of a waveform in a user interface is controlled by the computing device, in which the waveform represents the sound data and each of the sound data time intervals in the waveform have the mapped one or more colors.

In one or more examples, a method is described of increasing user efficiency in identifying particular sounds in a waveform display of sound data without listening to the sound data. Sound data received by a computing device is partitioned to form a plurality of sound data time intervals. One or more phonemes are identified by the computing device that are included in respective time intervals. The one or more phonemes for the respective time intervals are mapped by the computing device to one or more colors. Output of a waveform in a user interface is controlled by the computing device, in which the waveform represents the sound data and each of the sound data time intervals in the waveform have the mapped one or more colors thereby identifying respective phonemes.

In one or more examples, a system is described to increase user efficiency in identification of particular sounds in a waveform display of sound data without listening to the sound data. The system includes a partition module implemented at least partially in hardware to partition sound data to form a plurality of sound data time intervals and a signature computation module implemented at least partially in hardware to compute a signature for each of the plurality of sound data time intervals based on features extracted from respective sound data time intervals. The system also includes a mapping module implemented at least partially in hardware to map the computed signatures to one or more visual characteristics and a user interface module implemented at least partially in hardware to control output of a waveform in a user interface, in which the waveform represents the sound data and each of the sound data time intervals in the waveform have the mapped one or more visual characteristics.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 9 depicts an example implementation of the waveforms of FIG. 2 as displayed in the user interface as representing sound files.

DETAILED DESCRIPTION

Overview

Conventional techniques that rely on representation of sound through use of waveforms are difficult to interpret by unpracticed users. Indeed, even seasoned users are typically forced to guess at generalities of the sounds being represented overall, such as to guess whether a particular section of the waveform includes speech or other sounds, e.g., noise and so forth.

Waveform display control techniques involving visual characteristics are described. In one or more implementations, a waveform is configured based on how a human listener hears sounds. Visual characteristics such as colors are used to represent frequencies in a waveform that displays amplitude along one axis and time along another. For example, in the case of human speech the waveform is generated based on how human listeners hear. Phonemes are basic units of a phonology of human language that form meaningful units such as words or morphemes. The phonemes are mapped to colors in this example, with similar phonemes mapped to similar colors. The overall amplitude of the waveform is based on how a human listener perceives loudness of the sound, with another axis used to represent when and in what order the sounds are output.

In this way, a user viewing the waveform may more readily determine characteristics of the sounds being represented. These techniques are also applicable to representations of sounds other than human speech, such as noise, music (e.g., particular instruments), and so on, further discussion of which is contained in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
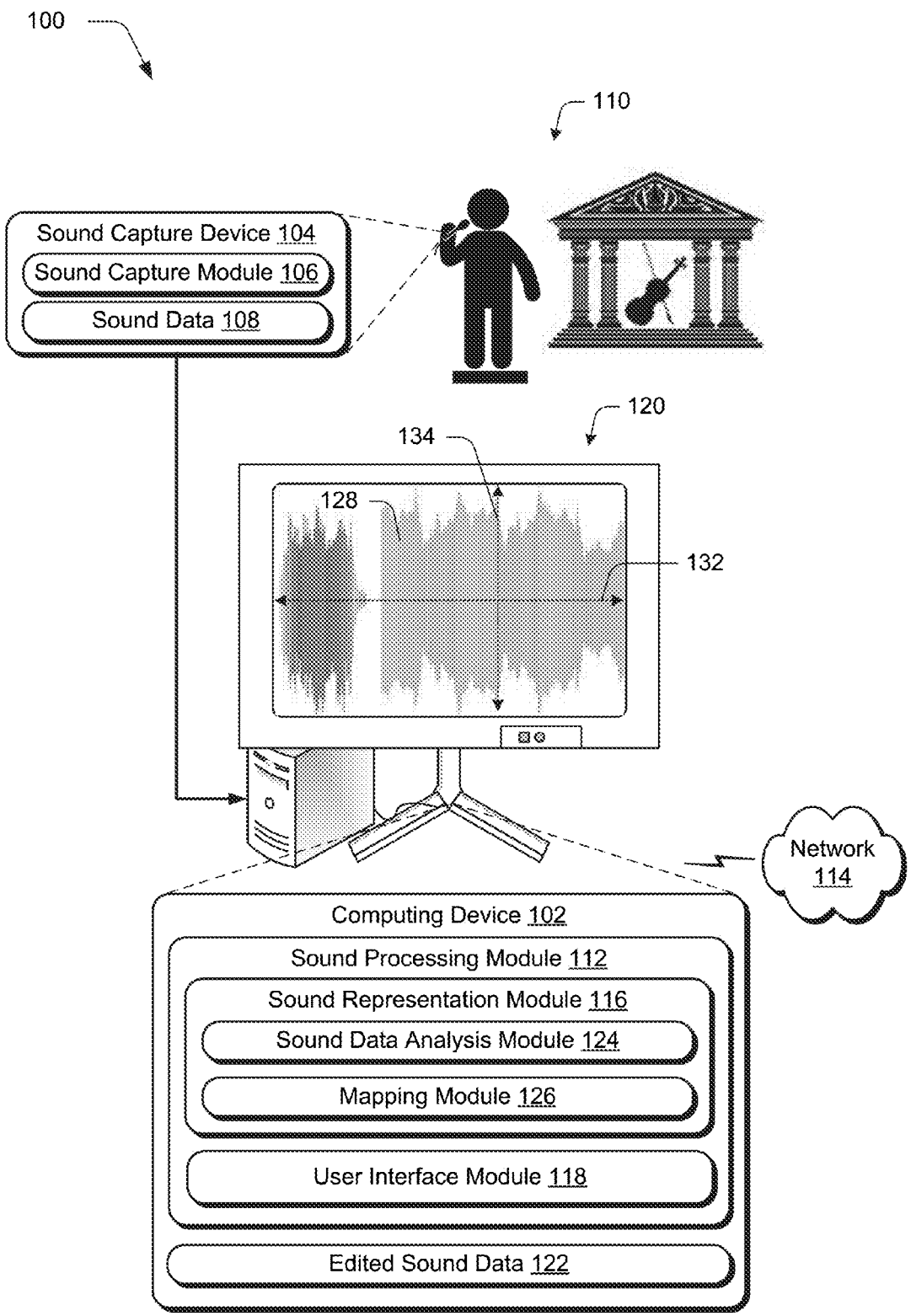
FIG. 1 is an illustration of an environment in an example implementation that is operable to employ visual characteristic control techniques described herein.

FIG. 1 is an illustration of an environment 100 in an example implementation that is operable to employ waveform display techniques described herein. The illustrated environment 100 includes a computing device 102 and a sound capture device 104, which are configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as further described in relation to FIG. 12.

The sound capture device 104 is also configurable in a variety of ways. Illustrated examples of one such configuration involves a standalone device but other configurations are also contemplated, such as part of a mobile phone, video camera, tablet computer, part of a desktop microphone, array microphone, and so on. Additionally, although the sound capture device 104 is illustrated separately from the computing device 102, the sound capture device 104 is configurable as part of the computing device 102, the sound capture device 104 may be representative of a plurality of sound capture devices, and so on.

The sound capture device 104 is illustrated as including a sound capture module 106 that is representative of functionality to generate sound data 108. The sound capture device 104, for instance, may generate the sound data 108 as a recording of an environment 110 surrounding the sound capture device 104 having one or more sound sources, e.g., such as speech from a user, music, and so forth. This sound data 108 is then obtained by the computing device 102 for processing.

The computing device 102 is also illustrated as including a sound processing module 112. The sound processing module 112 is representative of functionality to process the sound data 108. Although illustrated as part of the computing device 102, functionality represented by the sound processing module 112 may be further divided, such as to be performed "over the cloud" by one or more servers that are accessible via a network 114 connection, further discussion of which may be found in relation to FIG. 12.

An example of functionality of the sound processing module 112 is represented as a sound representation module 116 and a user interface module 118. The sound representation module 116 is representative of functionality to form a representation of the sound data 108 for output in a user interface 120. The user interface 120, for instance, may be configured to support sound editing operations to form edited sound data 122 from the sound data 108, such as source separation, enhancement, noise removal, splicing, and so forth. Accordingly, the user interface includes a visual representation of the sound data 108, with which, a user may interact.

In another example, the representation of the sound data 108 in the user interface 120 is usable to identify what sounds are captured by the sound data 108, such as to differentiate one sound file from another. The representation, for instance, may be included as part of a representation of the sound file (e.g., an icon) which is usable to identity characteristics of the sounds captured in the sound data 108, e.g., such as whether the sound data 108 includes speech (and even what is being said), music (e.g., characteristics of instruments and sounds in the music), noise, and so forth. A variety of other uses for a representation generated of the sound data 108 by the sound representation module 116 are also contemplated without departing from the spirit and scope thereof as further described in relation to FIG. 9.

In order to generate the representation of the sound data 108, the sound representation module 116 employs a sound data analysis module 124 and a mapping module 126 in the illustrated example. The sound data analysis module 124 is representation of functionality to extract features from the sound data 108 that are indicative of features of the sound data 108, such as what sounds are captured in the sound data 108. The mapping module 126 is representative of functionality to map these features to visual characteristics that can be visually differentiated by a user to determine differences in different types of sound data 108.

In the illustrated example, the user interface 120 includes a waveform 128 that includes a first axis 132 representing time and a second axis 134 that represents intensity (e.g., loudness) of the sound data 108 at particular points in time.

Other visual characteristics (e.g., color) are also used to represent the extracted characteristics of the sound data at these particular points in time.

The sound data analysis module 124, for instance, extracts frequency information from the sound data 108, which is mapped to a color space by the mapping module 126. In one or more implementations, the coloring is independent of recording level, and sounds that are perceived as similar by a human listener are represented by colors that are also perceived as similar by the human listener. In this way, sound editing techniques are enhanced by the improved user interface 120, audio-retrieval system can present colored waveforms displays as visual "thumbnails" in a list of sound search results or within a file, and so on. Further discussion of these and other examples is described in the following and shown in corresponding figures.

Figure 2:
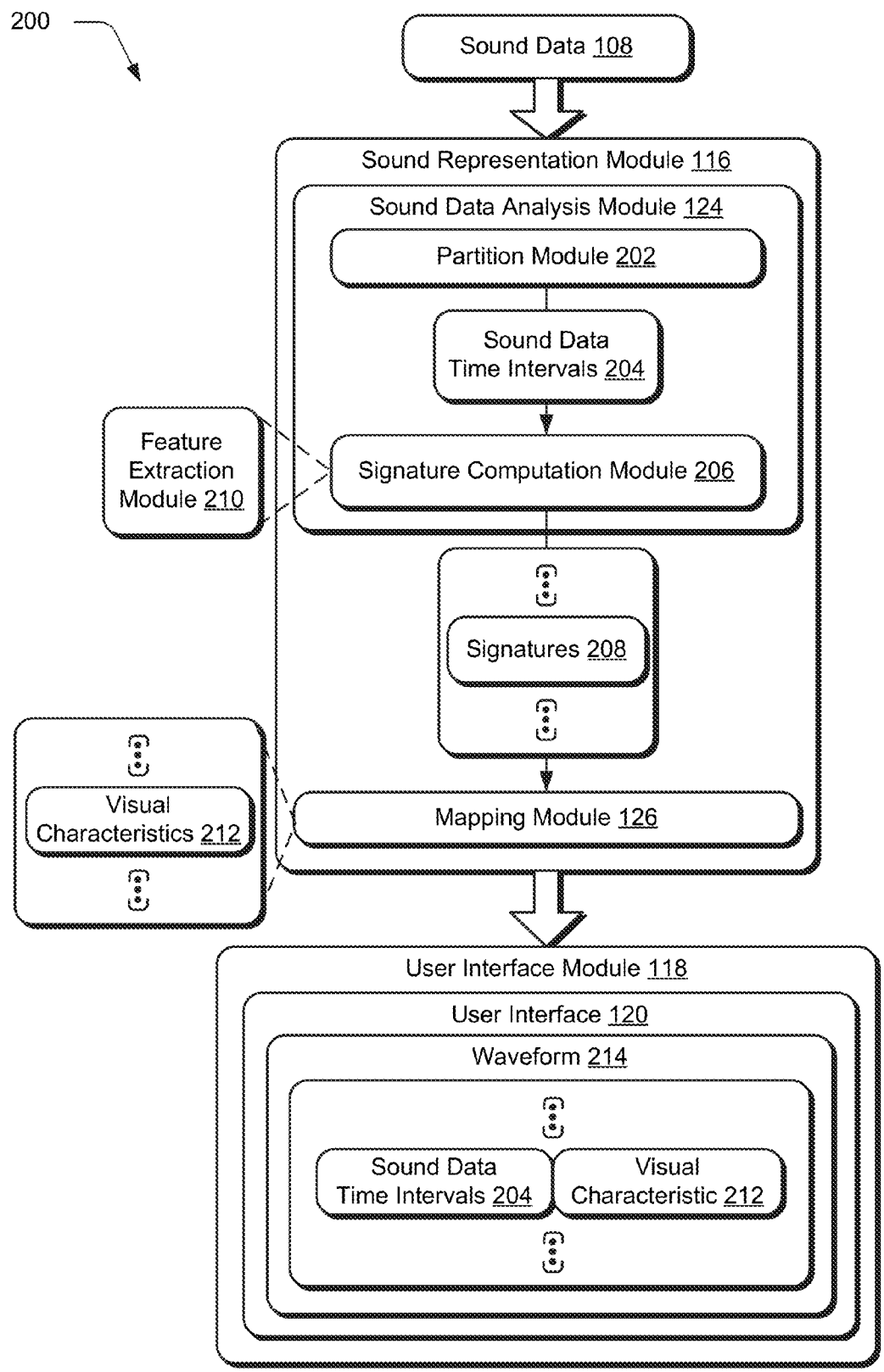
FIG. 2 depicts a system in example implementation showing a sound representation module and user interface module of FIG. 1 in greater detail as controlling output of a waveform a user interface.

FIG. 2 depicts a system 200 in example implementation showing the sound representation module 116 and user interface module 118 of FIG. 1 in greater detail as controlling output of a waveform a user interface. The sound representation module 116 includes the sound data analysis module 124 and the mapping module 126 as described in relation to FIG. 1.

Sound data 108, e.g., a sequence of digital audio samples, is received by the sound representation module 116. The sound data analysis module 124 employs a partition module 202 to partition the sound data 108 into sound data time intervals 204. For example, the sound data time intervals 204 form brief consecutive intervals taken from the sound data 108, e.g., fifty milliseconds for each interval.

The sound data time intervals 204 are then provided to a signature computation module 206 that is representation of functionality to create signatures 208 that describe differentiating characteristics of the sound data time intervals 204. For example, the signature computation module 206 may employ a feature extraction module 210 to extract frequency information from each of the sound data time intervals 204, such as by using a Fast Fourier Transform (FFT), linear prediction, wavelets, and so forth.

In one or more implementations, the signatures 208 represent relative strengths of the frequencies while being invariant with respect to scaling and polarity. In this way, amplification or attenuation of the sound data in the sound data time intervals 204 (e.g., multiplication by a nonzero constant) does not alter the signatures 208.

The signatures 208 are then used by the mapping module 126 to map one or more visual characteristics 212 (e.g., color, shading, texture, and so on) to the sound data time intervals 204. In a color example, the mapping module 126 employs a function to each of the signatures 208 to a corresponding color. There are an endless number of possible mappings, however, in one or more implementations the mapping is performed such that sounds perceived as similar to a human listener are mapped to colors that are also perceived as similar to the human.

The user interface module 118 then uses this mapping to generate a waveform 214 in which the sound data time intervals 204 are associated with visual characteristics 212, e.g., colors, in the user interface 120. Thus, within the waveform 214, each of the sound data time intervals 204 are painted by the color derived from the signature 208 representing the interval, which appear as vertical stripes in the user interface 120 as shown in FIG. 1.

Figure 3:
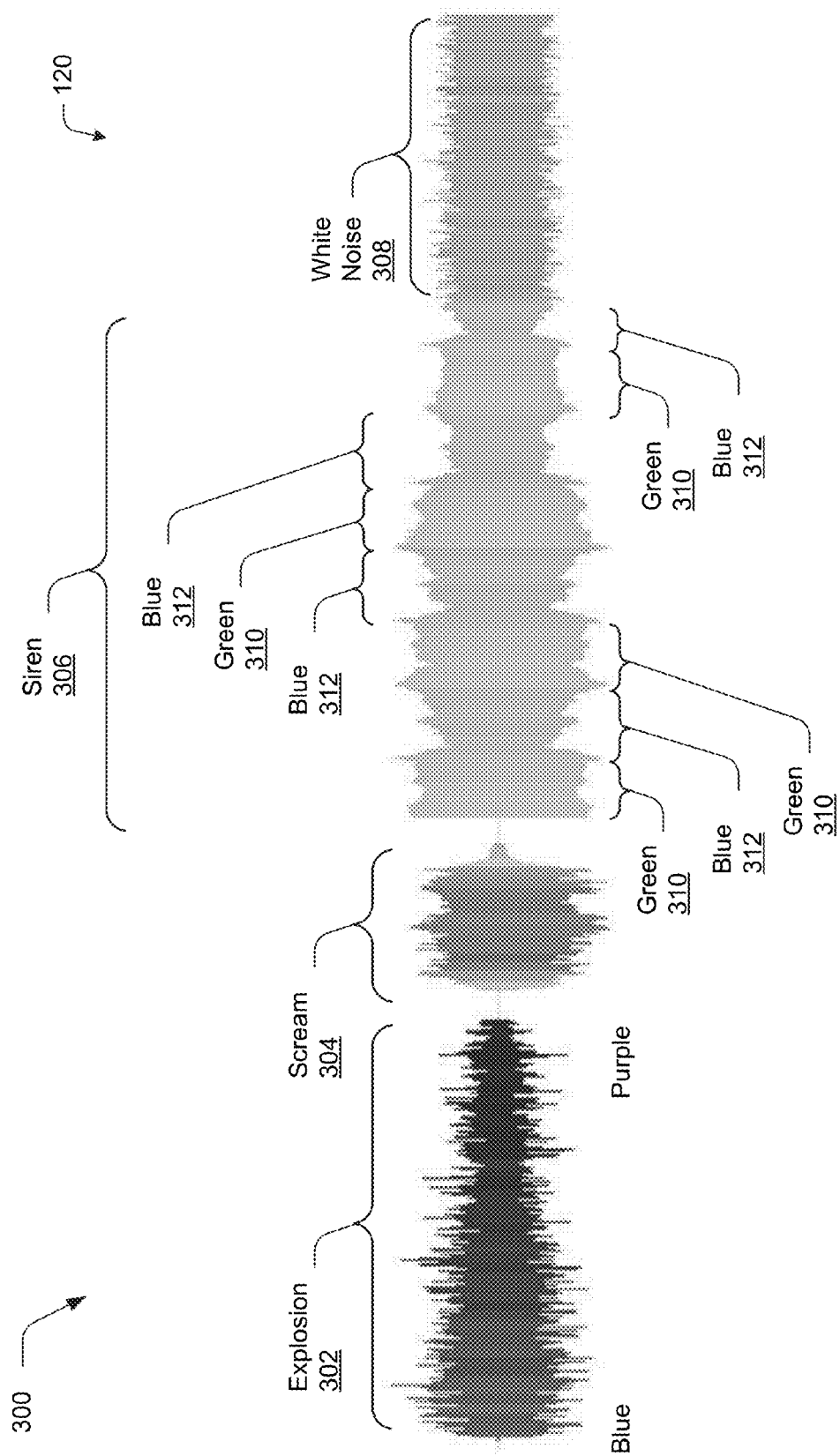
FIG. 3 depicts an example implementation of a waveform of FIG. 2 as displayed in a user interface as differentiating speech from other sounds.

FIG. 3 depicts an example implementation 300 of the waveform 214 of FIG. 2 as displayed in the user interface 120 as differentiating speech from other sounds. In this example, a sixteen-byte signature 208 is mapped to a twenty-four bit color in a red/green/blue color space. The mapping from sound to color is performed so that similar sounds are mapped to similar colors. An explosion 302 waveform, scream 304 waveform, siren 306 waveform, and white noise 308 waveform are shown. Red has a connotation of alarm and so does a scream 204, so a red component is increased in colors assigned to high-frequency sounds, i.e., the scream 304 is displayed using shades of red.

Low-frequency sounds, such as an explosion 302 waveform, are given dark colors so the explosion 302 waveform both looks and sounds ominous. Middle to high frequencies are shaded green 310, while low to mid-range frequencies are shaded blue 312. Thus, the siren 306 waveform in this example has alternating bands of green and blue such that a user may differentiate between these portions.

Noisy sounds such as the white noise 308 waveform are mapped to a gray color. When distinct sounds are played together, the louder sound is given a proportionally greater weighting on the color mapping. In the siren 306 waveform example, for instance, a blue sound commences just before the green sound has finished. Thus, in the brief interval when both sounds can be heard, the siren 306 waveform is colored by a mixture of blue and green shades of color.

Figure 4:
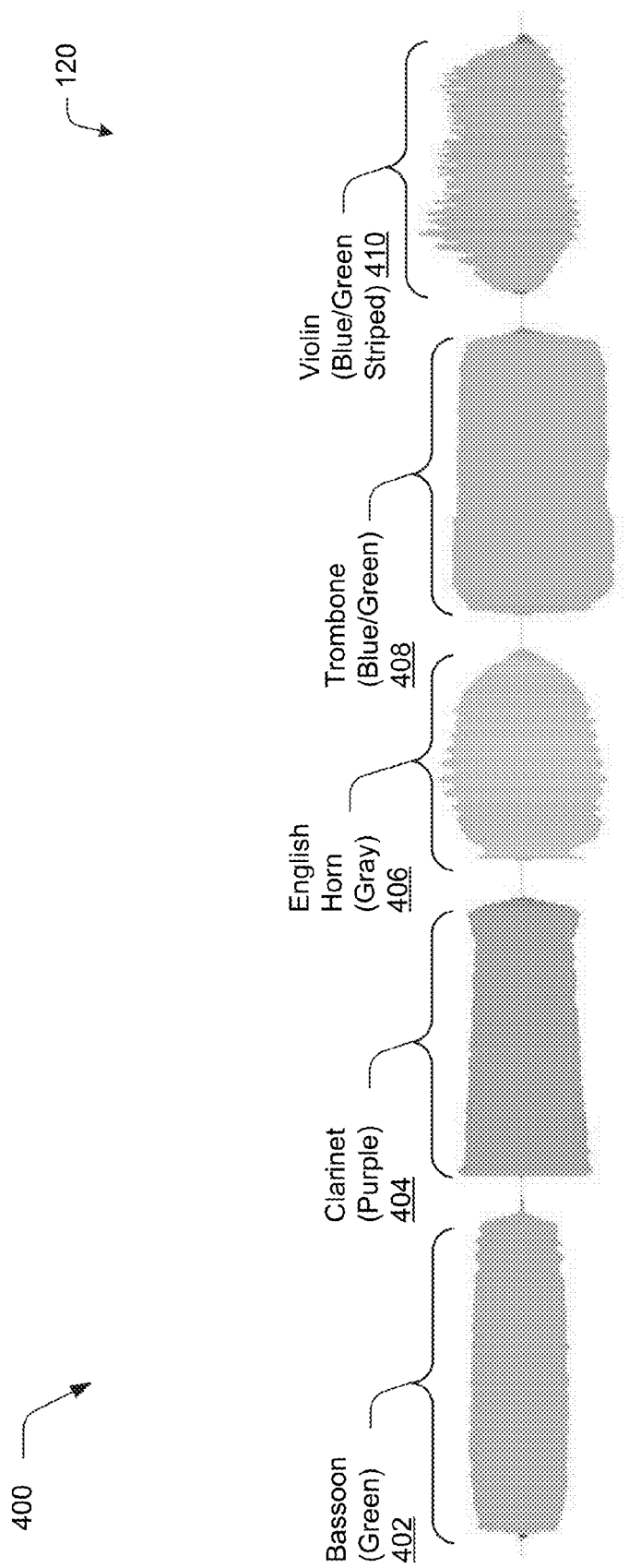
FIG. 4 depicts an example implementation of the waveform of FIG. 2 as displayed in the user interface as differentiating sounds from different musical instruments.

FIG. 4 depicts an example implementation 400 of the waveform 214 of FIG. 2 as displayed in the user interface 120 as differentiating sounds from different musical instruments. Mapping from sound to color may be performed to take into account all the frequency information and not solely the pitch. This allows the coloring of polyphony and inharmonic sounds, for which fundamental frequency cannot be determined.

In this example, the same note (e.g., E4) is played by a bassoon 402, clarinet 404, English horn 406, trombone 408, and violin 410, but different colors are mapped according to the harmonics of the instruments, e.g. green, purple, gray, blue/green, and blue/green striped, respectively. The striped pattern visible in the English horn 406 and violin 410 represent vibrato. Such subtle variations are thus made apparent through use of color in the user interface 120.

Figure 5:
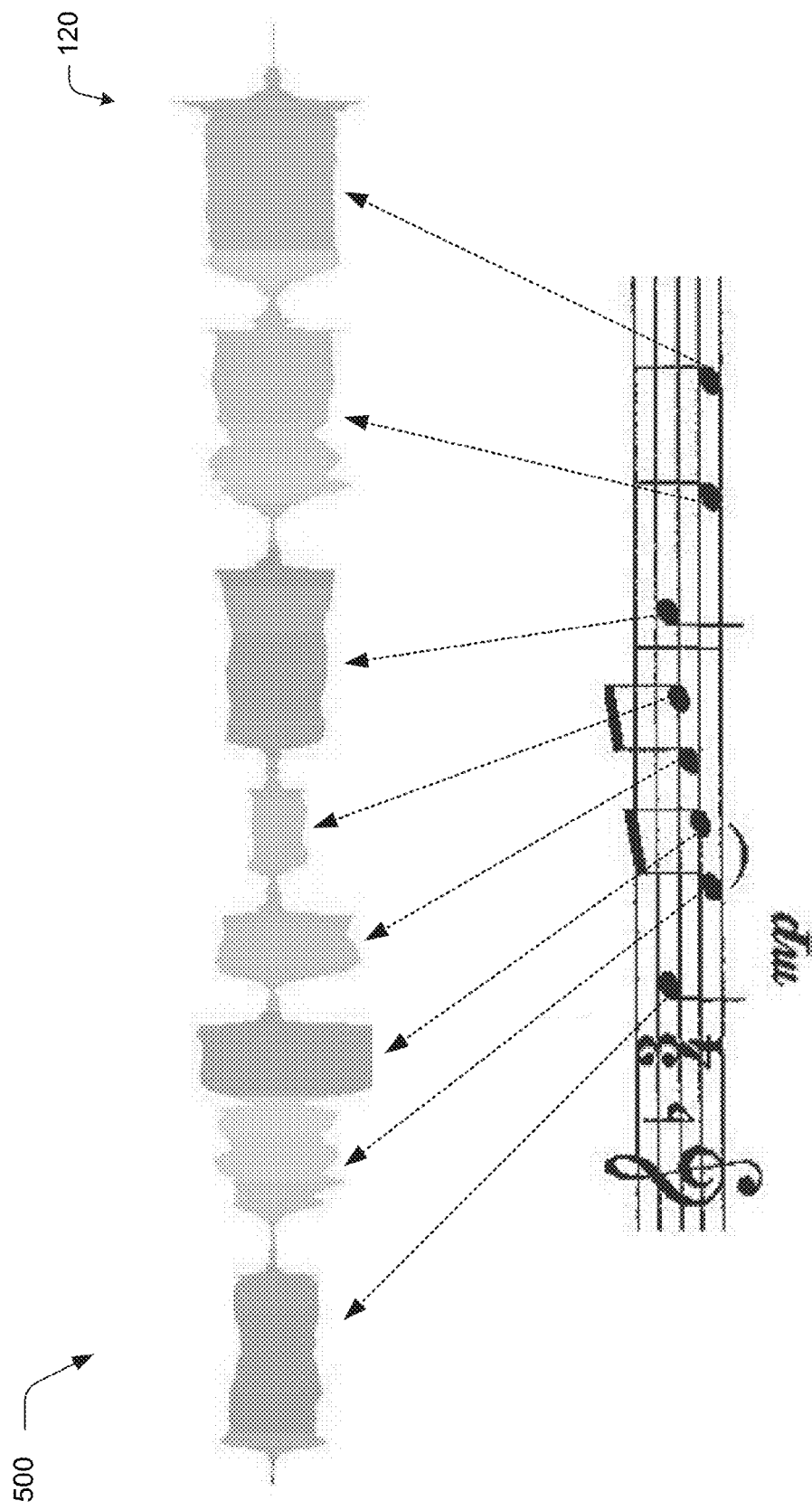
FIG. 5 depicts an example implementation of the waveform of FIG. 2 as displayed in the user interface as representing the first two measures of Bach's Minuet as played by an oboe.

FIG. 5 depicts an example implementation 500 of the waveform 214 of FIG. 2 as displayed in the user interface 120 as representing the first two measures of Bach's Minuet as played by an oboe. In this example, each note is assigned a color, e.g., pink, green, orange, light pink, gray, pink again, green again, and fading green. Subtle variations in the notes are observed at the attack and release points through variations in color.

Figure 6:
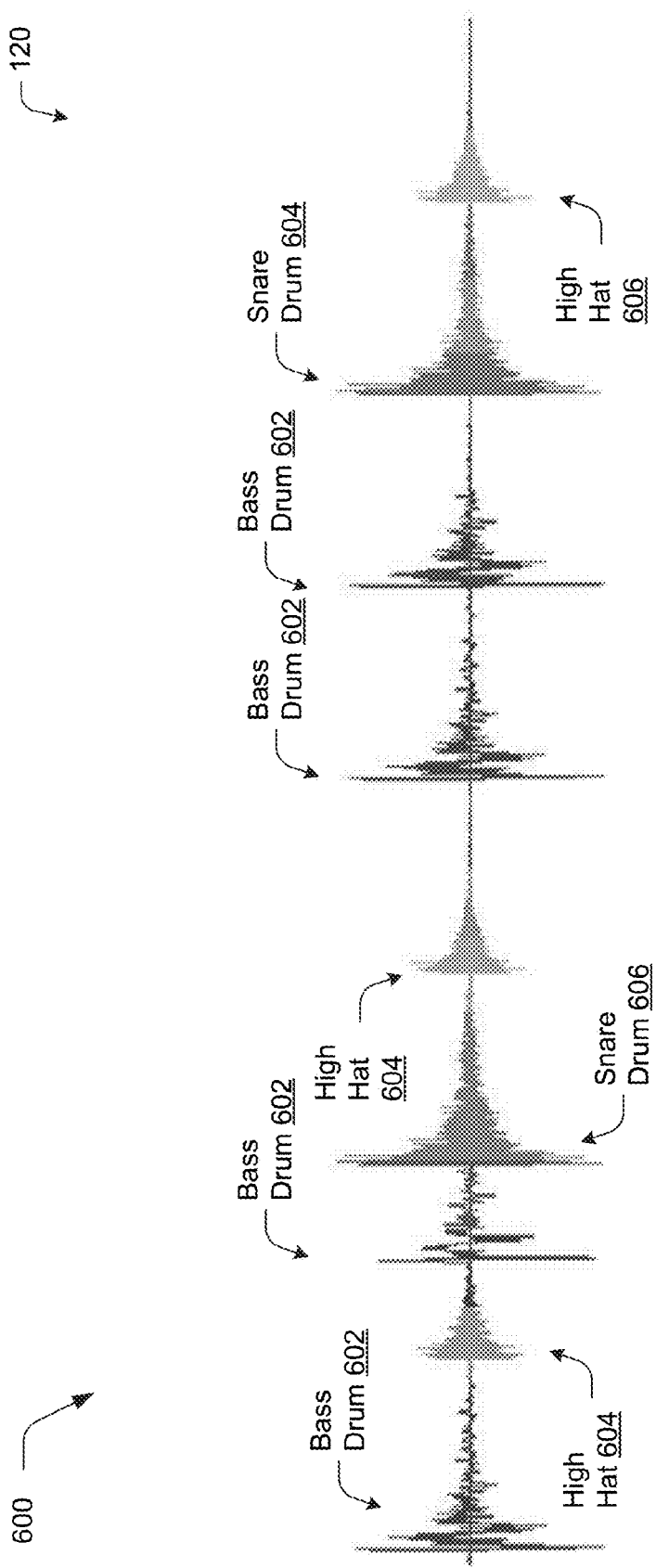
FIG. 6 depicts an example implementation of the waveform of FIG. 2 as displayed in the user interface as representing sounds originating from a drum set.

FIG. 6 depicts an example implementation 600 of the waveform 214 of FIG. 2 as displayed in the user interface 120 as representing sounds originating from a drum set. Waveforms of a bass drum 602, high hat 604, and snare drum 606 are represented using purple, blue, and gray, respectively and thus are readily distinguishable from each other even though the amplitude and time intervals are similar.

Figure 7:
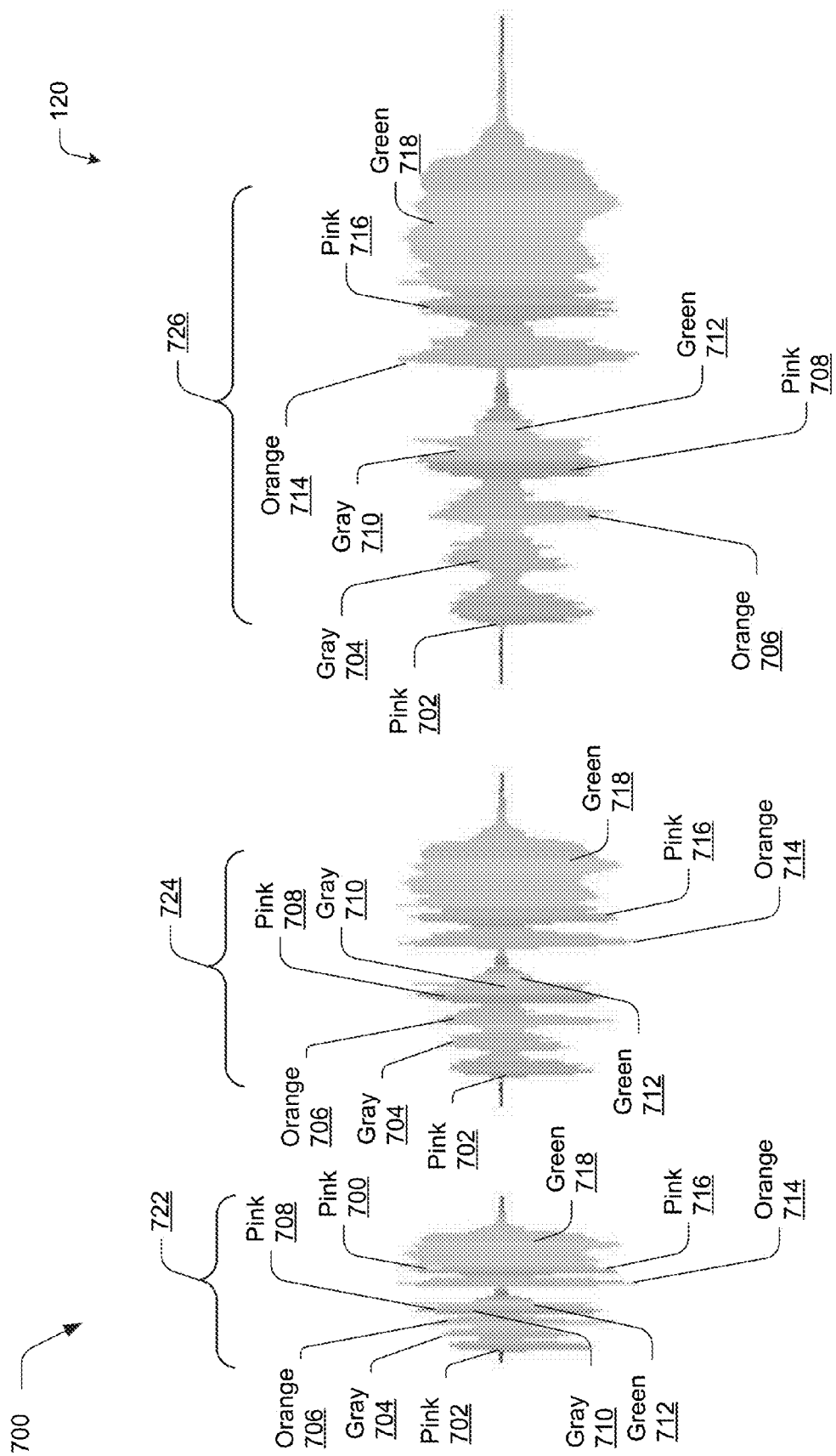
FIG. 7 depicts an example implementation of the waveform of FIG. 2 as displayed in the user interface as representing the same sounds at different zoom levels.

FIG. 7 depicts an example implementation 700 of the waveform 214 of FIG. 2 as displayed in the user interface 120 as representing the same sounds at different zoom levels. A waveform is shown as employing pink 702, gray 704, orange 706, pink 708, gray 710, green 712, orange 714, pink 716, and green 718 colors at first, second, and third levels 722, 724, 726 of zoom. As illustrated, the zooming changes the shape of the amplitude envelopes, but correspondence between color and sound is unchanged, thereby provide a stable visual landmark.

Figure 8:
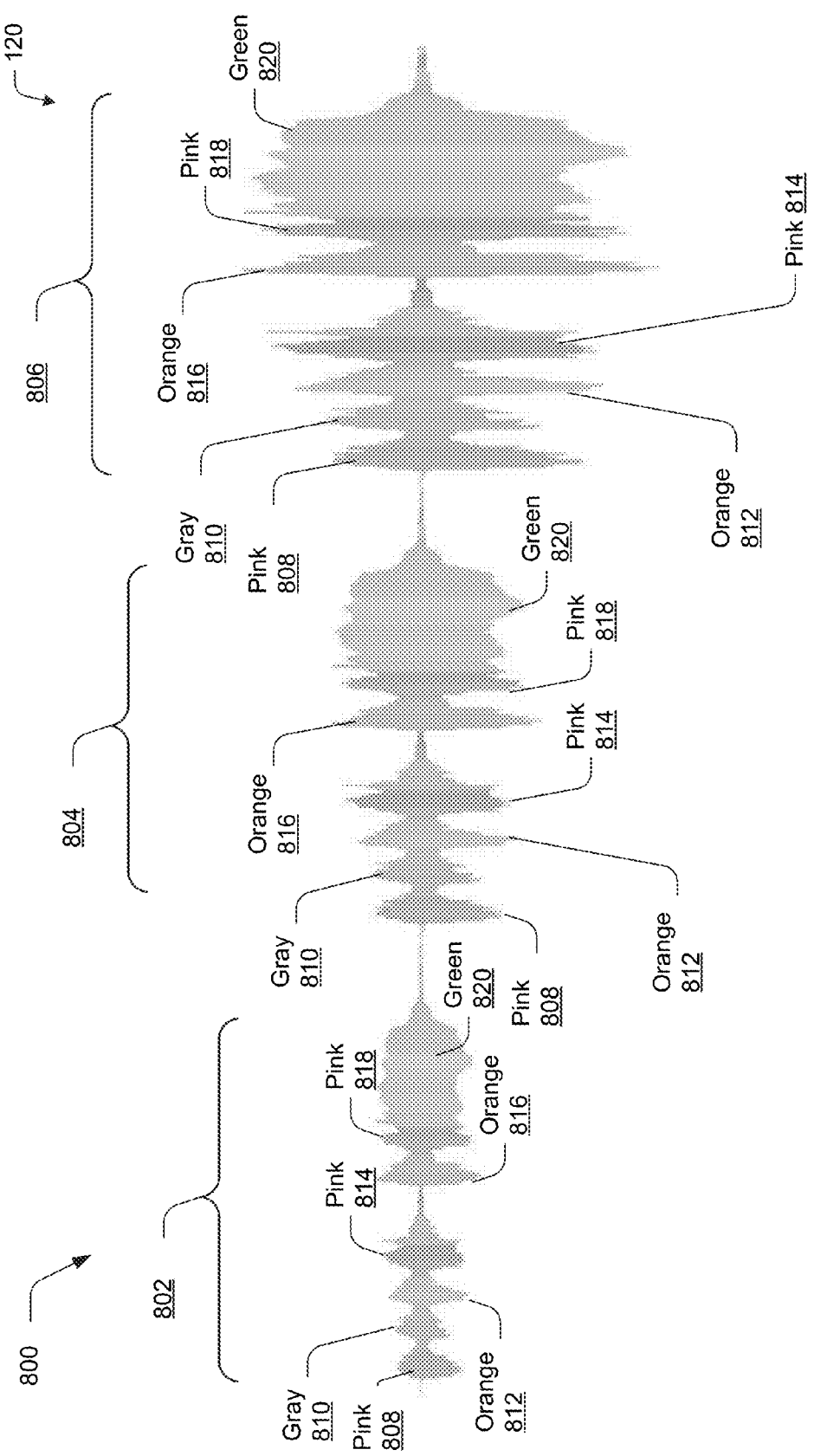
FIG. 8 depicts an example implementation of the waveform of FIG. 2 as displayed in the user interface as representing the same sounds at different recording levels in the user interface.

FIG. 8 depicts an example implementation 800 of the waveform 214 of FIG. 2 as displayed in the user interface 120 as representing the same sounds at different recording levels. First, second, and third levels 802, 804, 806 that are increasing are shown in the user interface 120. Because the signatures 208 are invariant with respect to scaling, the colors are unaffected by the changes in recording level in this example. For example, the order of pink 808, gray 810, orange 812, pink 814, orange 816, pink 818, and green 820 colors of peaks of the sound data 108 in the corresponding sound data time intervals 204 is unchanged.

Although there are more than sixteen million colors available in the 24-bit color space, the number of colors discernible to the human eye is quite less, e.g., approximately 100,000. The number of sounds represented by the signatures 208, however, is approximately $10^{30}$, and so a many-to-one mapping may be performed by the mapping module 126. In one or more implementations, the mapping assigns similar sounds to a particular RGB color. However, due to the shortage of discernible colors, sounds dominated by very high frequencies (e.g., above 2 kHz) may be assigned colors that are also used for lower frequencies.

In an example, rather than map the entire sonic universe to the color space, each audio recording is given a unique mapping of its sounds to the color space. While this may solve the color-shortage problems, users then learn a different correspondence between sound and color for each recording, which may make it difficult to compare color waveform displays of different recordings. In another example, by using only a single mapping from sound to color, users are able to learn correspondence between sound and color and develop an ability to visually read audio. That is, the users are able to obtain an impression of how a recording will sound without listening to it by viewing the colored waveform display.

FIG. 9 depicts an example implementation 900 of the waveforms 214 of FIG. 2 as displayed in the user interface 120 as representing sound files. In addition to use in user interfaces 120 configured to support editing of the sound data 108, the waveform displays are also usable as visual representations (e.g., "thumbnails") that represent recordings, e.g., such as in a list of search results returned by an audio-retrieval system. The colored waveform display is thus usable to help a user decide whether to listen to a recording retrieved by the system, e.g., for sound effects returned for a search.

Example Procedures

The following discussion describes waveform display control techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-9.

Figure 10:
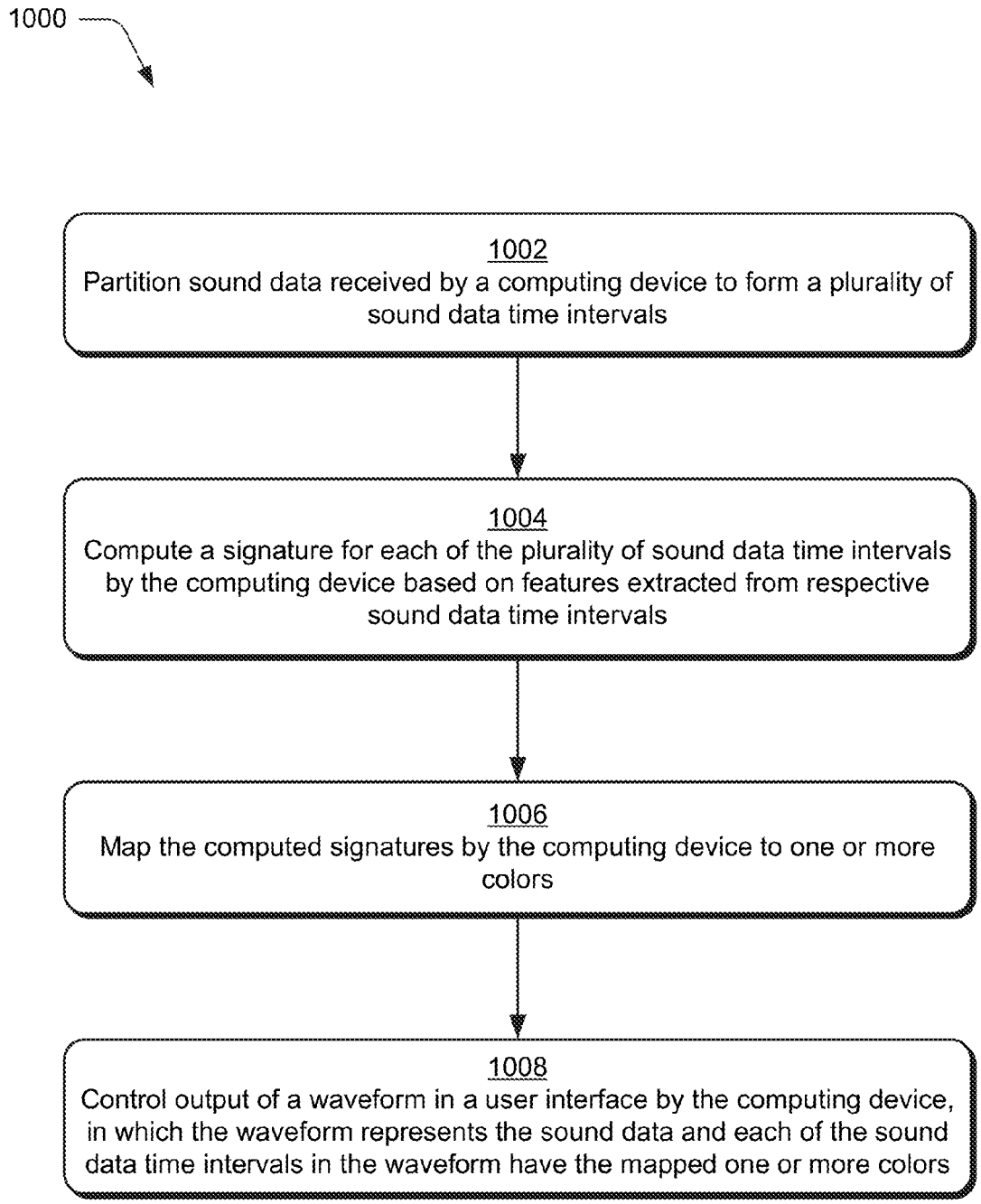
FIG. 10 is a flow diagram depicting a procedure in an example implementation of increasing user efficiency in identifying particular sounds in a waveform display of sound data.

FIG. 10 depicts a procedure 1000 in an example implementation of increasing user efficiency in identifying particular sounds in a waveform display of sound data without listening to the sound data. Sound data received by a computing device is partitioned to form a plurality of sound data time intervals (block 1002). A partition module 202, for instance is usable to form sound data time intervals 204 from sound data 108 as a series of success portions of the data in time.

A signature is computed for each of the plurality of sound data time intervals by the computing device based on features extracted from respective sound data time intervals (block 1004). The features, for instance, include frequency, harmonics, and other characteristics of sound data 108 suitable to differentiate one or more of the sound data time intervals 204 from each other. Signatures 208 are then computed using these features, which may be invariant with respect to scaling and polarity of the sound data within a respective sound data time interval.

The computed signatures are mapped by the computing device to one or more colors (block 1006). Continuing with the previous example, the signatures 208 may be computed using a frequency analysis in which perceptually-weighted averages are calculated over a plurality of frequency bands, e.g., 0-1500 Hz, 1500-4000 Hz, and 4000 Hz and up. The perceptual loudness in these bands is then identified with colors red, green, and blue. From these, a color angle is formed. A continuous mapping is then applied to align colors to sounds. For instance, deep vowels like "u" and "o" are mapped to deep red. Fricatives such as "s" and "sh" are mapped to turquoise. Other sounds produce other colors in a smooth manner that preserves distance, that is, similar sounds map to adjacent color angles.

Output of a waveform in a user interface is controlled by the computing device, in which the waveform represents the sound data and each of the sound data time intervals in the waveform have the mapped one or more colors (block 1008). In this way, a user may readily determine characteristics of sound data visually, such as in a sound editing user interface, as a representation (e.g., thumbnail), and so on without listening to the sound data 108.

Figure 11:
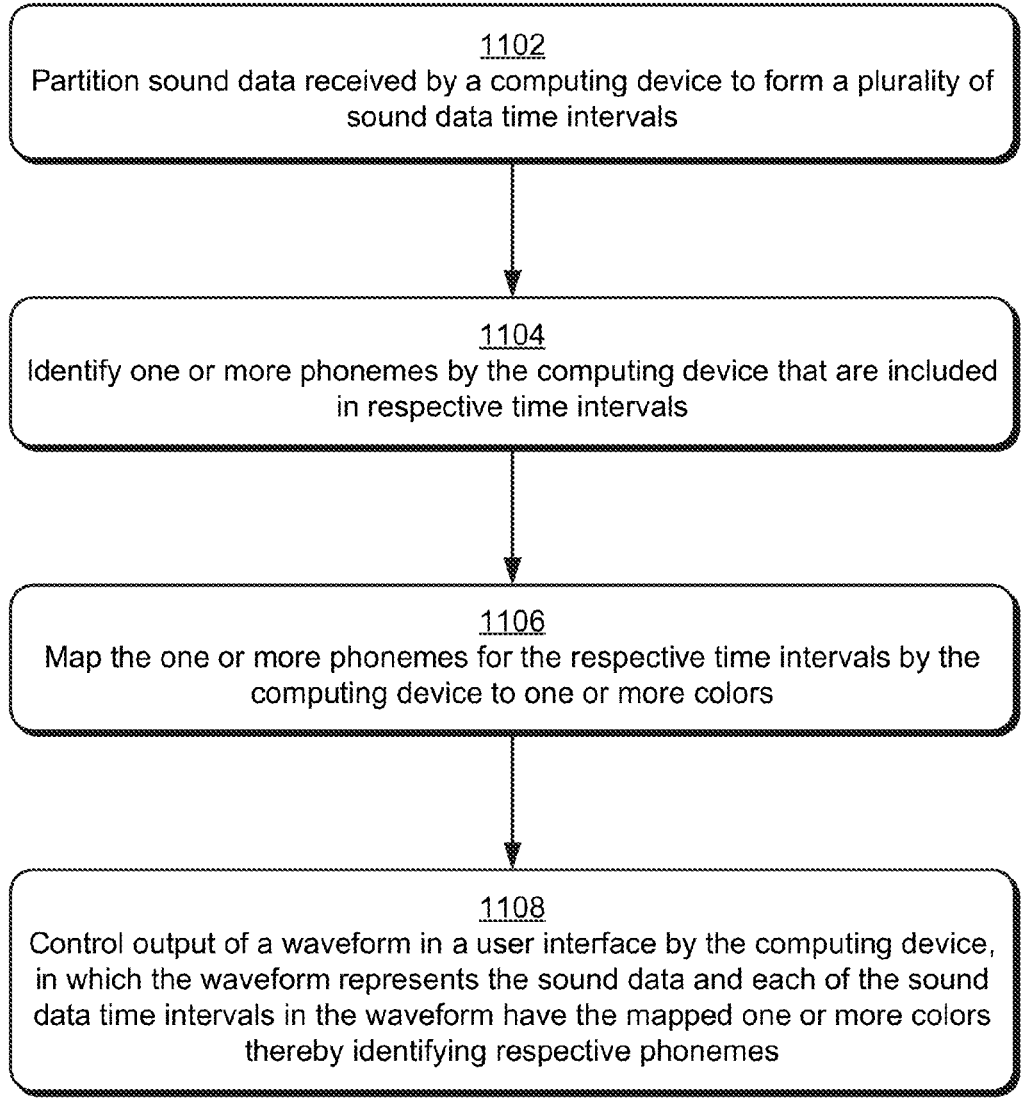
FIG. 11 is a flow diagram depicting a procedure in an example implementation of increasing user efficiency in identifying phonemes in a waveform display of sound data.

FIG. 11 depicts a procedure 1100 in an example implementation of increasing user efficiency in identifying phonemes in a waveform display of sound data. Sound data received by a computing device is partitioned to form a plurality of sound data time intervals (block 1102). As before, the sound data time intervals 204 to form a consecutive series of portions of the sound data 108.

One or more phonemes are identified by the computing device that are included in respective time intervals (block 1104). Phonemes are basic units of a phonology of human language that form meaning units such as words or morphemes. Accordingly, the sound data analysis module 124 is configured in this example to identify characteristics of phonemes to identify their presence in the sound data time intervals 204 in the sound data 108.

The one or more phonemes for the respective time intervals are mapped by the computing device to one or more colors (block 1106). For example, sounds of the sound data perceived as similar by human listeners are mapped to colors that are perceived as similar by the human listeners.

Output of a waveform in a user interface is controlled by the computing device, in which the waveform represents the sound data and each of the sound data time intervals in the waveform have the mapped one or more colors thereby identifying respective phonemes (block 1108). In this way, a user may readily determine properties of the sound data 108 without actually listening to the sound data.

For example, each phenome is represented by a color with similar phonemes mapped to similar colors. The overall amplitude of the display of the waveform is based on how human listeners perceive loudness of the sound data 108. Accordingly, during playback of the sound data 108 and through watching the waveform simultaneously a user may be trained in how the display relates to the speech of other sounds. For instance, a user is able to locate words over a certain length whenever these words occur, if a speaker repeats a phrase it is immediately noticeable, and so on. In addition, splice points may be automatically identified that promote seamless editing. Thus, with a few minutes of training even a casual user can edit speech in a professional-sounding manner.

Example System and Device

Figure 12:
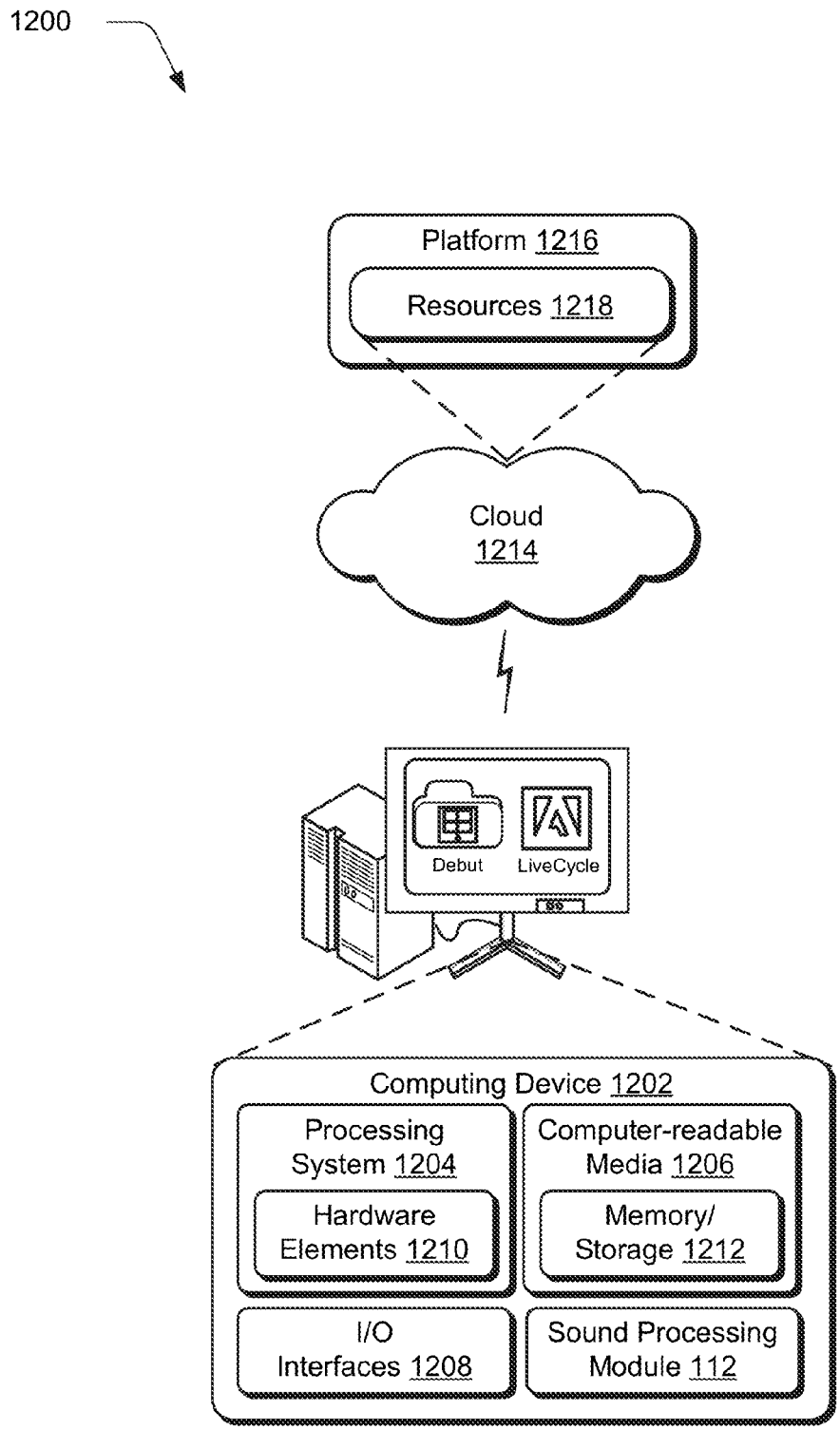
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. This is illustrated through inclusion of the sound processing module 112. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method of increasing user efficiency in identifying particular sounds in a waveform display of sound data without listening to the sound data, the method comprising:
   partitioning sound data received by a computing device to form a plurality of sound data time intervals;
   computing a signature for each of the plurality of sound data time intervals by the computing device based on features extracted from respective said sound data time intervals;
   mapping the computed signatures by the computing device to one or more colors of a color space by computing a color angle within the color space as perceptually-weighted averages calculated over a plurality of frequency bands; and
   controlling output of a waveform in a user interface by the computing device, in which the waveform represents the sound data and each of the sound data time intervals in the waveform have the mapped one or more colors.

2. A method as described in claim 1, further comprising extracting the features from the respective said sound data time intervals using a fast Fourier transform (FFT), linear prediction, or wavelets.

3. A method as described in claim 2, wherein the features include frequency of the sound data and the signatures hold a description of frequency content of the respective said sound data time intervals.

4. A method as described in claim 1, wherein the signature is representative of relative strengths of frequencies.

5. A method as described in claim 1, wherein the signature is invariant with respect to scaling and polarity of the sound data within a respective said sound data time interval.

6. A method as described in claim 1, wherein the mapping is performed such that sounds of the sound data perceived as similar by human listeners are mapped to colors that are perceived as similar by the human listeners.

7. A method as described in claim 1, wherein the mapping takes into account pitch and harmonics.

8. A method as described in claim 1, wherein the waveform is configured as a representation of the sound data as stored by the computing device.

9. A method as described in claim 1, wherein the waveform is included in the user interface that is configured to support editing of the sound data.

10. A method of increasing user efficiency in identifying particular sounds in a waveform display of sound data without listening to the sound data, the method comprising:
    partitioning sound data received by a computing device to form a plurality of sound data time intervals;
    computing a signature for each of the plurality of sound data time intervals by the computing device based on features extracted from respective said sound data time intervals;
    mapping the computed signatures for the respective said time intervals by the computing device to one or more colors, the mapping employing a weighting for each a plurality of sounds within a respective said sound data time interval based on loudness of each of the plurality of sounds; and
    controlling output of a waveform in a user interface by the computing device, in which the waveform represents the sound data and each of the sound data time intervals in the waveform have the mapped one or more colors.

11. A method as described in claim 10, wherein the computed signatures correspond to one or more phonemes as basic units of a phonology of human language that form meaning units such as words or morphemes.

12. A method as described in claim 10, wherein the mapping is performed such that sounds of the sound data perceived as similar by human listeners are mapped to colors that are perceived as similar by the human listeners.

13. A method as described in claim 10, wherein an amplitude of the waveform is indicative of relative intensity of the sound data.

14. A system of increasing user efficiency in identifying particular sounds in a waveform display of sound data without listening to the sound data, the system comprising:
- a partition module implemented at least partially in processing and memory hardware of a computing device to partition sound data to form a plurality of sound data time intervals;
- a signature computation module implemented at least partially in processing and memory hardware of the computing device to compute a signature for each of the plurality of sound data time intervals based on features extracted from respective said sound data time intervals;
- a mapping module implemented at least partially in processing and memory hardware of the computing device to map the computed signatures to one or more colors of a color space by computing a color angle within the color space as perceptually-weighted averages calculated over a plurality of frequency bands; and
- a user interface module implemented at least partially in processing and memory hardware of the computing device to control output of a waveform in a user interface, in which the waveform represents the sound data and each of the sound data time intervals in the waveform have the mapped one or more colors.

15. A system as described in claim 14, wherein the mapping is performed such that sounds of the sound data perceived as similar by human listeners are mapped to colors that are perceived as similar by the human listeners.

16. A system as described in claim 14, wherein the mapping is performed by computing the color angle as perceptually-weighted averages using colors from the color space that are associated with respective frequency bands.

17. A system as described in claim 14, wherein the mapping takes into account pitch and harmonics.

18. A system as described in claim 14, wherein the waveform is configured as a representation of the sound data as stored by the computing device or is included in the user interface that is configured to support editing of the sound data.

19. A system as described in claim 14, wherein the signature is representative of relative strengths of frequencies.

20. A system as described in claim 14, wherein the signature is invariant with respect to scaling and polarity of the sound data within a respective said sound data time interval.

* * * * *